United States Patent
Chung et al.

(10) Patent No.: US 9,803,104 B2
(45) Date of Patent: Oct. 31, 2017

(54) STEREOSCOPIC FABRICS WITH SPECIAL PATTERNS AND TACTILE TEXTURE PRODUCED BY AN ECO-FRIENDLY NON-DYE FORMULATION

(71) Applicant: Formosa Taffeta Co., Ltd., Touliu (TW)

(72) Inventors: Hsing-Nan Chung, Touliu (TW); Meng-Yueh Wu, Touliu (TW)

(73) Assignee: Formosa Taffeta Co., Ltd., Touliu (TW)

( * ) Notice: Subject to any disclaimer, the term of this patent is extended or adjusted under 35 U.S.C. 154(b) by 320 days.

(21) Appl. No.: 14/484,457

(22) Filed: Sep. 12, 2014

(65) Prior Publication Data

US 2015/0072115 A1    Mar. 12, 2015

(30) Foreign Application Priority Data

Sep. 12, 2013   (TW) .............................. 102133016 A

(51) Int. Cl.
| | | |
|---|---|---|
| *C09D 175/04* | (2006.01) | |
| *C09D 133/00* | (2006.01) | |
| *B05D 7/24* | (2006.01) | |
| *B05D 1/28* | (2006.01) | |
| *D06M 15/564* | (2006.01) | |
| *D06M 15/263* | (2006.01) | |
| *D06Q 1/00* | (2006.01) | |
| *D06Q 1/08* | (2006.01) | |
| *D06Q 1/10* | (2006.01) | |
| *B05D 3/02* | (2006.01) | |

(52) U.S. Cl.
CPC ............. *C09D 175/04* (2013.01); *B05D 1/28* (2013.01); *B05D 3/0209* (2013.01); *B05D 3/0254* (2013.01); *B05D 7/24* (2013.01); *C09D 133/00* (2013.01); *D06M 15/263* (2013.01); *D06M 15/564* (2013.01); *D06Q 1/00* (2013.01); *D06Q 1/08* (2013.01); *D06Q 1/10* (2013.01); *D06M 2200/50* (2013.01); *Y10T 428/2481* (2015.01)

(58) Field of Classification Search
CPC .. C09D 175/04; C09D 133/00; B05D 3/0254; B05D 3/0209; B05D 7/24; B05D 1/28; D06M 15/263; D06M 15/564; D06M 2200/50; D06Q 1/00; D06Q 1/08; D06Q 1/10; Y10T 428/2481

See application file for complete search history.

(56) References Cited

U.S. PATENT DOCUMENTS

| | | | | |
|---|---|---|---|---|
| 4,560,604 A | * | 12/1985 | Shimizu ................. | D04H 11/00 427/412 |
| 6,673,394 B1 | * | 1/2004 | Hayashi ............. | D06B 11/0089 427/261 |
| 2005/0129970 A1 | * | 6/2005 | Yokochi .................. | B32B 29/00 428/542.2 |

FOREIGN PATENT DOCUMENTS

| | | | |
|---|---|---|---|
| CN | 1059574 | A | 3/1992 |
| CN | 1489624 | A | 4/2004 |
| CN | 101694061 | A | 4/2010 |
| CN | 102720074 | A | 10/2012 |
| CN | 102839543 | A | 12/2012 |
| CN | 202588407 | U | 12/2012 |
| GB | 696578 | * | 9/1953 |
| GB | 736663 | | 9/1955 |
| JP | 404308272 | * | 10/1992 |
| JP | 11286645 | | 10/1999 |
| TW | I222479 | B | 10/2004 |
| TW | 200833848 | A | 8/2008 |

OTHER PUBLICATIONS

Extended European Search Report for corresponding European Patent Application No. 14184584.2, pp. 1-8 (dated Mar. 10, 2015.
Office Action and Search Report for Taiwan Patent Application No. 102133016, p. 1 (dated Dec. 16, 2014).
Office Action from corresponding Chinese Patent Application No. 201310413899.5, pp. 1-9, (dated Aug. 19, 2016).

* cited by examiner

*Primary Examiner* — Amina Khan
(74) *Attorney, Agent, or Firm* — Hoffmann & Baron, LLP

(57) ABSTRACT

The invention is related to a processing formulation and method for producing fabrics which are eco-friendly and easy to implement. The invention provides stereoscopic fabrics with special patterns and tactile texture produced by an eco-friendly non-dye formulation and process.

14 Claims, 1 Drawing Sheet

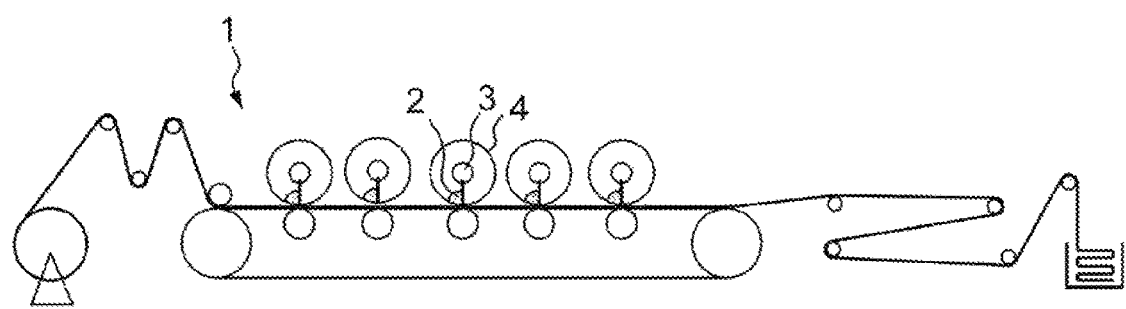

STEREOSCOPIC FABRICS WITH SPECIAL PATTERNS AND TACTILE TEXTURE PRODUCED BY AN ECO-FRIENDLY NON-DYE FORMULATION

CROSS-REFERENCE TO RELATED APPLICATION

This Application claims priority to Taiwanese patent application number 102133016, filed on Sep. 12, 2013 and the contents of which in its entirety are herein incorporated by reference.

BACKGROUND OF THE INVENTION

1. Field of the Invention

The subject invention is related to a processing formulation and method for producing stereoscopic fabrics with special patterns and tactile texture without traditional processes such as dyeing, printing or flocking.

2. Description of the Related Art

Conventional printing methods include direct printing, discharge printing, embossing, digital printing or rotary printing. Direct printing is a method of forming patterns directly with printing pastes. Discharge printing forms patterns by dyeing base cloth a plain shade, printing patterns on the plain shade base cloth or "grey" with printing pastes including discharge agents and removing the plain shade by heating. Embossing is carried out by stamping a steel mold on cloth under high pressure and high temperature so that the patterns on the mold are transferred to the cloth. Digital printing is carried out by applying slurry comprising an auxiliary agent to grey and ink-jet printing patterns onto the grey. Rotary printing uses a rotary printing machine to transfer patterns onto fabrics; the patterns produced by rotary printing create a rugged impression and are suitable for abstract designs, warpwise stripes or large angle inclined lines. Rotary printing is inexpensive, avoids problems such as bridging marks and is suitable for mass production. As shown in FIG. 1, element 1 represents a rotary printing machine; element 2 represents a colorant paste; element 3 represents a colorant tube; and element 4 represents a screen.

The aforementioned prior art methods form printing fabrics mainly by adopting pastes to carry dyes and auxiliary agents; applying screens and mechanical blade movements to precisely distribute and locate colorant pastes on grey; using steamers to transfer the dyes included in the colorant pastes to fabrics; and using washing machines to wash away the dyes, auxiliary agents and pastes remaining on the fabrics.

Such washing process for removing the residual dyes, auxiliary agents and pastes is not only energy-consuming but also imposes an environmental burden due to the large amount of waste water produced. Further, the prior art printing methods only provide flat patterns rather than stereoscopic patterns, and extra processes such as embroidery, jacquard weaving or flocking are needed to produce stereoscopic patterns on the fabrics. Such extra processes raise both the cost and the complexity of the fabric printing methods and thus are disadvantageous.

In view of the aforementioned problems in the conventional printing methods such as energy consumption, undesirable ecological consequences and complexity, an eco-friendly printing method which provides stereoscopic fabric with special patterns and tactile texture based on simple processes is needed.

SUMMARY OF THE INVENTION

The subject invention is related to stereoscopic fabrics with special patterns and tactile texture produced by an eco-friendly non-dye method. The subject invention provides a processing formulation and method for producing stereoscopic fabrics with special patterns and tactile texture in which the stereoscopic patterns are formed without need for dyes and extra processes such as traditional embroidery, jacquard weaving or flocking. Taking undyed white desized grey, a kind of grey, on which a processing formulation including special resin composites is applied for example, the characteristics such as special flexibility, transparency, tactile texture and stereoscopic effect may be obtained simply through physical changes and chemical reactions during the drying process. Traditional dyeing, printing or flocking processes are not needed. In addition, various patterns or designs on fabrics can be made. The fabrics of the subject invention not only have special flexibility, transparency, tactile texture and stereoscopic effect but are also aesthetically pleasing and fashionable.

BRIEF DESCRIPTION OF THE DRAWING

FIG. 1 shows a rotary printing machine used in a conventional rotary printing process.

DETAILED DESCRIPTION OF THE INVENTION

Terms are defined below to facilitate the understanding of the content of the invention.

In this context, the term "about" is used to indicate that a value measured by a person of ordinary skill in the art includes the acceptable variation of error which is determined to a certain extent by how the measurement is carried out.

Unless otherwise explained in context, terms such as "a," "the" or the like include both the singular and plural forms thereof. Further, for the sake of definiteness, the sizes of the elements or areas in the figures may be exaggerated rather than depicted according to their actual size ratios.

Also, it should be understood that any numerical range recited herein is intended to include all sub-ranges and numbers subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10, such as 1.2 to 8.8 or 0.6 to 7.5, and numbers, such as 5.6 or 8.

According to one embodiment, the subject invention provides processing formulation, which comprises an aqueous resin, a crosslinking agent, a thickener, flocking powder and a colorant paste and imparts special patterns, tactile texture and stereoscopic effect to the fabrics prepared thereby.

The aqueous resin comprises polyurethane (PU) resin, acrylic resin or the combination thereof.

The thickener is advantageous for the processability of the processing formulation, i.e., forming the processing formulation into a gum paste. The thickener has a content of about 0.1 to about 5 parts by weight, preferably about 0.3 to about 1 parts by weight based on 100 parts by weight of the aqueous resin.

The flocking powder imparts a special, smooth texture to the fabrics and enhances visual softness. The flocking powder has a content of about 1 to about 20 parts by weight, preferably about 1 to about 10 parts by weight based on 100 parts by weight of the aqueous resin.

The crosslinking agent improves the crosslinking degree of the components in the processing formulation. The crosslinking agent has a content of about 1 to about 5 parts by weight, preferably about 2 to about 4 parts by weight based on 100 parts by weight of the aqueous resin.

The colorant paste renders the patterns in various colors. The colorant paste has a content of about 1 to about 15 parts by weight, preferably about 3 to about 10 parts by weight based on 100 parts by weight of the aqueous resin.

In addition, the processing formulation may further comprise a foaming agent, which decomposes during the drying process and emits gases such that the processing formulation paste expands to enhance the stereoscopic effect of the fabrics. Based on 100 parts by weight of the aqueous resin, the foaming agent has a content of about 0 to about 20 parts by weight, preferably about 0 to about 10 parts by weight.

The processing formulation may be used together with other functional auxiliary agents to provide the prepared fabrics with functions such as thermal insulation, anti-bacterial properties, deodorization, anti-static effect, luminous properties, thermochromisim, abrasion or electromagnetic shielding or with the property of cooling a person's skin upon contact.

According to another embodiment of the subject invention, the subject invention provides a method for forming stereoscopic fabrics with special patterns and tactile texture by means of a printing and non-dye process, comprising:
(a) printing a processing formulation onto fabrics, wherein the processing formulation comprises an aqueous resin, a crosslinking agent, a thickener, flocking powder and a colorant paste;
(b) drying the fabrics to which the processing formulation is applied under a certain drying temperature for a drying period; and
(c) ripening the fabrics at a ripening temperature above the drying temperature.

The printing in step (a) may be plate direct printing, rotary printing or other printing process. The drying temperature is from about 90° C. to about 150° C., preferably from about 100° C. to about 140° C., more preferably from about 100° C. to about 130° C. The drying period is from 30 to 100 seconds, preferably from 50 to 80 seconds, more preferably from 55 to 65 seconds. The ripening temperature is from about 110° C. to about 180° C., preferably from about 120° C. to about 170° C., more preferably from about 130° C. to about 160° C.

Optionally, the printing process may be followed by water spraying or other processing processes as needed. For example, padding or coating may be applied to protect the patterns or impart the aforementioned functions to the fabrics.

According to further embodiment of the subject invention, the subject invention provides stereoscopic fabrics with special patterns and tactile texture.

EXAMPLES

Embodiments are provided below to further illustrate the subject invention. Although illustrative embodiments have been described in reference to the subject invention, it should be understood that such embodiments are not intended to limit the scope of the subject invention, and the features which can be easily modified or adjusted by a person of ordinary skill in the art would fall into the scope of the present specification and the claims attached hereto.

Embodiment 1:
Base cloth: white desized grey

| Processing formulation: (parts by weight) | |
|---|---|
| aqueous resin | 100 |
| crosslinking agent | 3 |
| thickener | 0.5 |
| foaming agent | 2 |
| flocking powder | 10 |
| colorant paste | 5 |
| functional auxiliary agent | 6 |

Processing: applying the processing formulation onto the white desized grey by plate direct printing, drying the desized grey at 100° C. to 130° C. for about 60 seconds; and ripening the desized grey at 130° C. to 160° C. to obtain stereoscopic fabrics with special patterns or tactile texture.

Embodiment 2:
Base cloth: white desized grey

| Processing formulation: (parts by weight) | |
|---|---|
| aqueous resin | 100 |
| crosslinking agent | 3 |
| tackifier | 0.5 |
| foaming agent | 2 |
| flocking powder | 10 |
| colorant paste | 5 |
| functional auxiliary agent | 6 |

Processing: applying the processing formulation onto the white desized grey by rotary printing, drying the desized grey at 100° C. to 130° C. for about 60 seconds; and ripening the desized grey at 130° C. to 160° C. to obtain stereoscopic fabrics with special patterns or tactile texture.

What is claimed is:
1. A processing formulation, comprising an aqueous resin, a crosslinking agent, a thickener, flocking powder and a colorant paste, wherein based on 100 parts by weight of the aqueous resin, the crosslinking agent has a content of about 1 to about 5 parts by weight, the thickener has a content of about 0.1 to about 5 parts by weight, the flocking powder has a content of about 1 to about 20 parts by weight, and the colorant paste has a content of about 1 to about 15 parts by weight.

2. The processing formulation according to claim 1, wherein the aqueous resin comprises polyurethane (PU) resin, acrylic resin or a combination thereof.

3. The processing formulation according to claim 1, wherein based on 100 parts by weight of the aqueous resin, the thickener has a content of about 0.3 to about 1 parts by weight, and the flocking powder has a content of about 1 to about 10 parts by weight.

4. The processing formulation according to claim 1, further comprising a functional auxiliary agent.

5. The processing formulation according to claim 4, wherein the functional auxiliary agent provides the fabrics prepared by the processing formulation with functions of thermal insulation, anti-bacterial properties, deodorization, anti-static effect, luminous properties, thermochromisim, abrasion or electromagnetic shielding or with the property of cooling a person's skin upon contact.

6. The processing formulation according to claim 1, further comprising a foaming agent.

7. The processing formulation according to claim 1, wherein a foaming agent may or may not be present in a content of about 0 to about 20 parts by weight based on 100 parts by weight of the aqueous resin.

8. A method for forming stereoscopic fabrics with special patterns and tactile texture produced by means of a printing and non-dye process, comprising:
   (a) printing the processing formulation according to claim 1 on fabrics;
   (b) drying the fabrics on which the processing formulation is printed under a certain drying temperature for a drying period; and
   (c) ripening the fabrics at a ripening temperature above the drying temperature.

9. The method according to claim 8, wherein the printing in step (a) is plate direct printing, rotary printing or other printing process.

10. The method according to claim 8, wherein the drying temperature is from about 90° C. to about 150° C.

11. The method according to claim 8, wherein the drying period is from about 30 to about 100 seconds.

12. The method according to claim 8, wherein the ripening temperature is from about 110° C. to about 180° C.

13. The method according to claim 8, further comprising water spraying or other processing processes.

14. Stereoscopic fabrics with special patterns and tactile texture produced by the method according to claim 8.

* * * * *